United States Patent
Ash et al.

(10) Patent No.: US 9,280,485 B2
(45) Date of Patent: *Mar. 8, 2016

(54) EFFICIENT CACHE VOLUME SIT SCANS

(71) Applicant: INTERNATIONAL BUSINESS MACHINES CORPORATION, Armonk, NY (US)

(72) Inventors: Kevin J. Ash, Tucson, AZ (US); Michael T. Benhase, Tucson, AZ (US); Lokesh M. Gupta, Tucson, AZ (US); Kenneth W. Todd, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 286 days.

This patent is subject to a terminal disclaimer.

(21) Appl. No.: 14/074,337

(22) Filed: Nov. 7, 2013

(65) Prior Publication Data

US 2014/0082283 A1    Mar. 20, 2014

Related U.S. Application Data

(63) Continuation of application No. 13/617,130, filed on Sep. 14, 2012, now Pat. No. 8,832,379.

(51) Int. Cl.
*G06F 12/08* (2006.01)

(52) U.S. Cl.
CPC ........ *G06F 12/0895* (2013.01); *G06F 12/0802* (2013.01); *G06F 12/0871* (2013.01); *G06F 2212/462* (2013.01)

(58) Field of Classification Search
CPC ............ G06F 12/0846; G06F 12/0864; G06F 12/0866; G06F 12/0895; G06F 2212/462; G06F 2212/466
See application file for complete search history.

(56) References Cited

U.S. PATENT DOCUMENTS

| | | | |
|---|---|---|---|
| 4,875,155 A | 10/1989 | Iskiyan et al. | |
| 6,567,817 B1 | 5/2003 | VanLeer | |
| 7,085,911 B2 | 8/2006 | Sachedina et al. | |
| 7,836,107 B2 | 11/2010 | Gandhi et al. | |
| 8,055,850 B2 | 11/2011 | Gupta | |
| 8,095,736 B2 | 1/2012 | Rossi | |
| 2005/0188156 A1 | 8/2005 | Mukker et al. | |
| 2009/0222621 A1 | 9/2009 | Ash et al. | |
| 2010/0037226 A1 | 2/2010 | Benhase et al. | |
| 2012/0166448 A1 | 6/2012 | Li et al. | |

*Primary Examiner* — Hal Schnee
(74) *Attorney, Agent, or Firm* — Griffiths & Seaton PLLC

(57) ABSTRACT

A processor, operable in a computing storage environment, allocates portions of a Scatter Index Table (SIT) disproportionately between a larger portion dedicated for meta data tracks, and a smaller portion dedicated for user data tracks, and processes a storage operation through the disproportionately allocated portions of the SIT using an allocated number of Task Control Blocks (TCB).

7 Claims, 4 Drawing Sheets

EFFICIENT CACHE VOLUME SIT SCANS

CROSS REFERENCE TO RELATED APPLICATIONS

This application is a Continuation of U.S. patent application Ser. No. 13/617,130, filed on Sep. 14, 2012.

FIELD OF THE INVENTION

The present invention relates in general computing systems, and more particularly to, systems and methods for increased data management efficiency in computing storage environments.

DESCRIPTION OF THE RELATED ART

In today's society, computer systems are commonplace. Computer systems may be found in the workplace, at home, or at school. Computer systems may include data storage systems, or disk storage systems, to process and store data. Contemporary computer storage systems are known to destage, and subsequently, demote storage tracks from cache to long-term storage devices so that there is sufficient room in the cache for data to be written.

SUMMARY OF THE INVENTION

In some conventional computing storage environments featuring Cached control units, when a Cache volume commit or discard scan is started, such an operation may employ from 1 Task Control Block (TCB) to as many TCBs as there are available processors in the environment.

When multiple TCBs are used, the Cache Scatter Index Table (SIT) is typically divided equally amongst the TCBs, such that each TCB is processing a different portion of the SIT, and thus a unique set of Cache Tracks.

With more than 8 Central Processing Units (CPUs), and in some cases 32 CPUs involved in a particular storage environment, allocating one TCB per CPU for each directory scan may end up consuming too many TCBs. Furthermore, if all the work that needs to be done by the scan is skewed to one area of the SIT, most of the TCBs will finish early doing no work, leaving all the work to be done by just the few remaining TCBs.

With 1 TerraByte (TB) Cache, a single volume can fit in a small portion of the SIT. Accordingly, when the SIT is divided into several portions based on the number of CPUs, a likely occurrence is that one or two portions will have all of the available work to be done, leaving other portions without work. As a result, most of the TCBs will find no work to do, whereas one or two TCBs will take an exorbitant time to perform work. This scenario may adversely impact the duration, for example, of a cache scan operation. A need exists for a mechanism by which these potential drawbacks are alleviated.

Accordingly, and in view of the foregoing, various embodiments for cache management in a computing storage environment are provided. In one embodiment, by way of example only, a method of cache management by a processor device in a computing storage environment is provided. Portions of a Scatter Index Table (SIT) are allocated disproportionately between a larger portion dedicated for meta data tracks, and a smaller portion dedicated for user data tracks. A storage operation is processed through the disproportionately allocated portions of the SIT using an allocated number of Task Control Blocks (TCBs).

Other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As mentioned previously, in some conventional computing storage environments featuring Cached control units, when a Cache volume commit or discard scan is started, such an operation may employ from 1 Task Control Block (TCB) to as may TCBs as there are available processors in the environment.

When multiple TCBs are used, the Cache Scatter Index Table (SIT) is typically divided equally amongst the TCBs, such that each TCB is processing a different portion of the SIT, and thus a unique set of Cache Tracks.

With more than 8 Central Processing Units (CPUs), and in some cases 32 CPUs involved in a particular storage environment, allocating one TCB per CPU for each directory scan may end up consuming too many TCBs. Furthermore, if all the work that needs to be done by the scan is skewed to one area of the SIT, most of the TCBs will finish early doing no work, leaving all the work to be done by just the few remaining TCBs.

With 1 TerraByte (TB) Cache, a single volume can fit in a small portion of the SIT. Accordingly, when the SIT is divided into several portions based on the number of CPUs, a likely occurrence is that one or two portions will have all of the available work to be done, leaving other portions without work. As a result, most of the TCBs will find no work to do, whereas one or two TCBs will take an exorbitant time to perform work. This scenario may adversely impact the duration, for example, of a cache scan operation. A need exists for a mechanism by which these potential drawbacks are alleviated.

In contrast to these conventional techniques, which may serve to increase overhead and resource consumption, the mechanisms of the present invention seek to disproportionately allocate portions of the SIT into a larger number of chunks for meta data tracks and a much smaller number of chunks for user-specific data. In this way, more total TCBs are allocated to processing chunks versus a few TCBs that are tasked to perform much of the work. As a result, cache scan operations may be reduced in duration and overall computing performance may increase.

Figure 1:
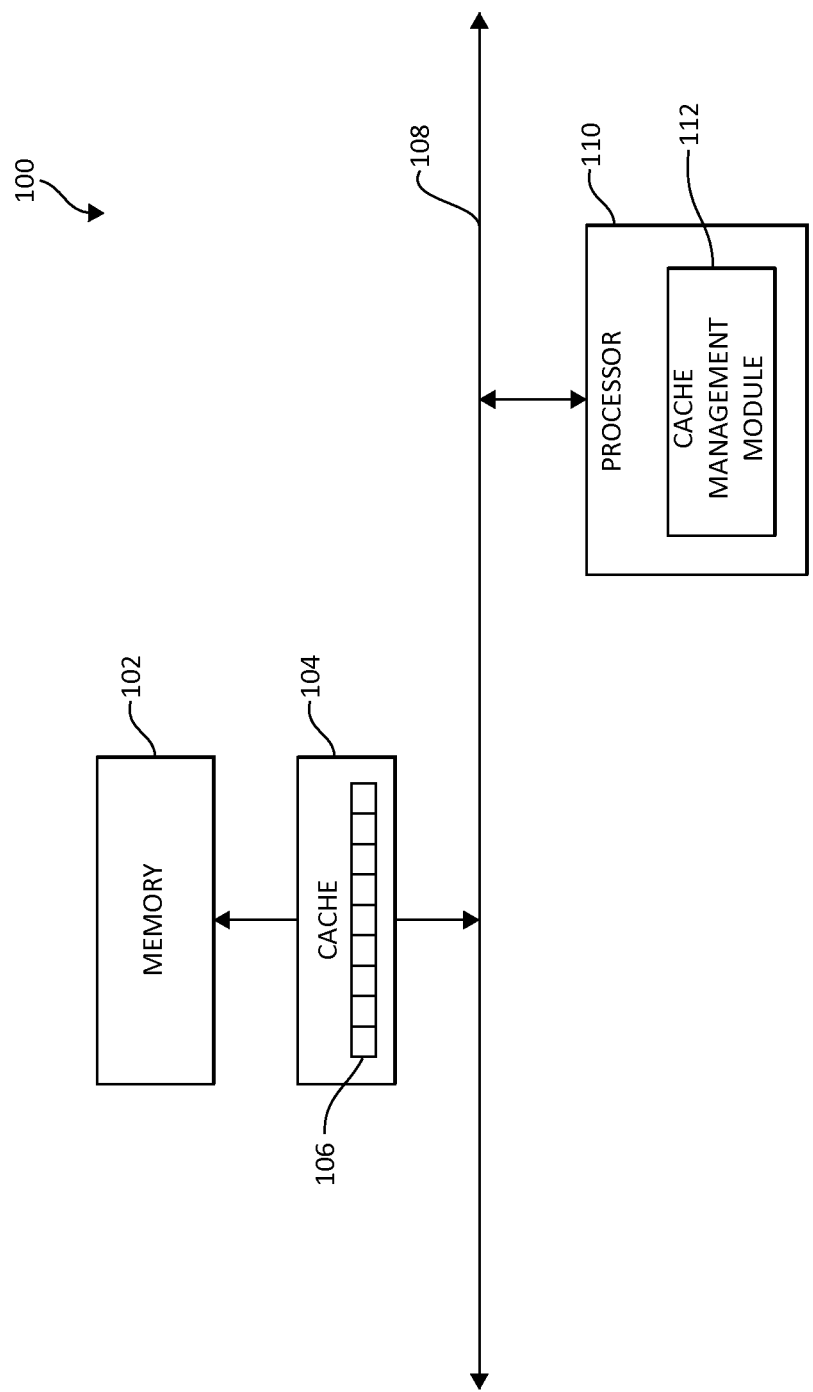
FIG. 1 is an exemplary block diagram showing a hardware structure for cache management in which aspects of the present invention may be realized.

Turning to FIG. 1, a block diagram of one embodiment of a system 100 for data management incorporating various aspects of the present invention is illustrated. At least in the illustrated embodiment, system 100 comprises a memory 102 coupled to a cache 104 and a processor 110 via a bus 108 (e.g., a wired and/or wireless bus).

Memory 102 may be any type of memory device known in the art or developed in the future. Examples of memory 102 include, but are not limited to, an electrical connection having one or more wires, a portable computer diskette, a hard disk, a random access memory (RAM), an erasable programmable read-only memory (EPROM or Flash memory), an optical fiber, a portable compact disc read-only memory (CD-ROM), an optical storage device, a magnetic storage device, or any suitable combination of the foregoing. In the various embodiments of memory 102, storage tracks are capable of being stored in memory 102. Furthermore, each of the storage tracks can be staged or destaged from/to memory 102 from cache 104 when data is written to the storage tracks.

Cache 104, in one embodiment, comprises a write cache partitioned into one or more ranks 106, where each rank 106 includes one or more storage tracks. Cache 104 may be any cache known in the art or developed in the future.

During operation, the storage tracks in each rank 106 are destaged to memory 102 in a foreground destaging process after the storage tracks have been written to. That is, the foreground destage process destages storage tracks from the rank(s) 106 to memory 102 while a host (not shown) is actively writing to various storage tracks in the ranks 106 of cache 104. Ideally, a particular storage track is not being destaged when one or more hosts desire to write to the particular storage track, which is known as a destage conflict.

In various embodiments, processor 110 comprises or has access to a cache management module 112, which comprises computer-readable code that, when executed by processor 110, causes processor 110 to perform data management operations in accordance with aspects of the illustrated embodiments. In the various embodiments, processor 110 allocates portions of a Scatter Index Table (SIT) disproportionately between a larger portion dedicated for meta data tracks, and a smaller portion dedicated for user data tracks, and processes a storage operation through the disproportionately allocated portions of the SIT using an allocated number of Task Control Blocks (TCB).

In various other embodiments, processor 110 allocates the number of TCBs.

In various other embodiments, processor 110, pursuant to processing the storage operation through the disproportionately allocated portions of the SIT, performs a cache scan operation, wherein the TCBs are scan TCBs.

In various other embodiments, processor 110 determines relative sizes of the disproportionately allocated portions of the SIT.

In various other embodiments, processor 110 acquires a data segment to be processed according to the storage operation.

In various other embodiments, processor 110, subsequent to acquiring the data segment to be processed, determines, by one of the TCBs, if the data segment to be processed is a user data segment or a meta data segment.

In various other embodiments, processor 110, if the data segment is a user data segment, moves a pointer to point to a next user track area of the user data track portion of the SIT, and processes the SIT for the user data track, and if the data segment is a meta data segment, moves the pointer to point to a next meta data track area of the meta data track portion of the SIT, and processes the SIT for the meta data track.

Figure 2:
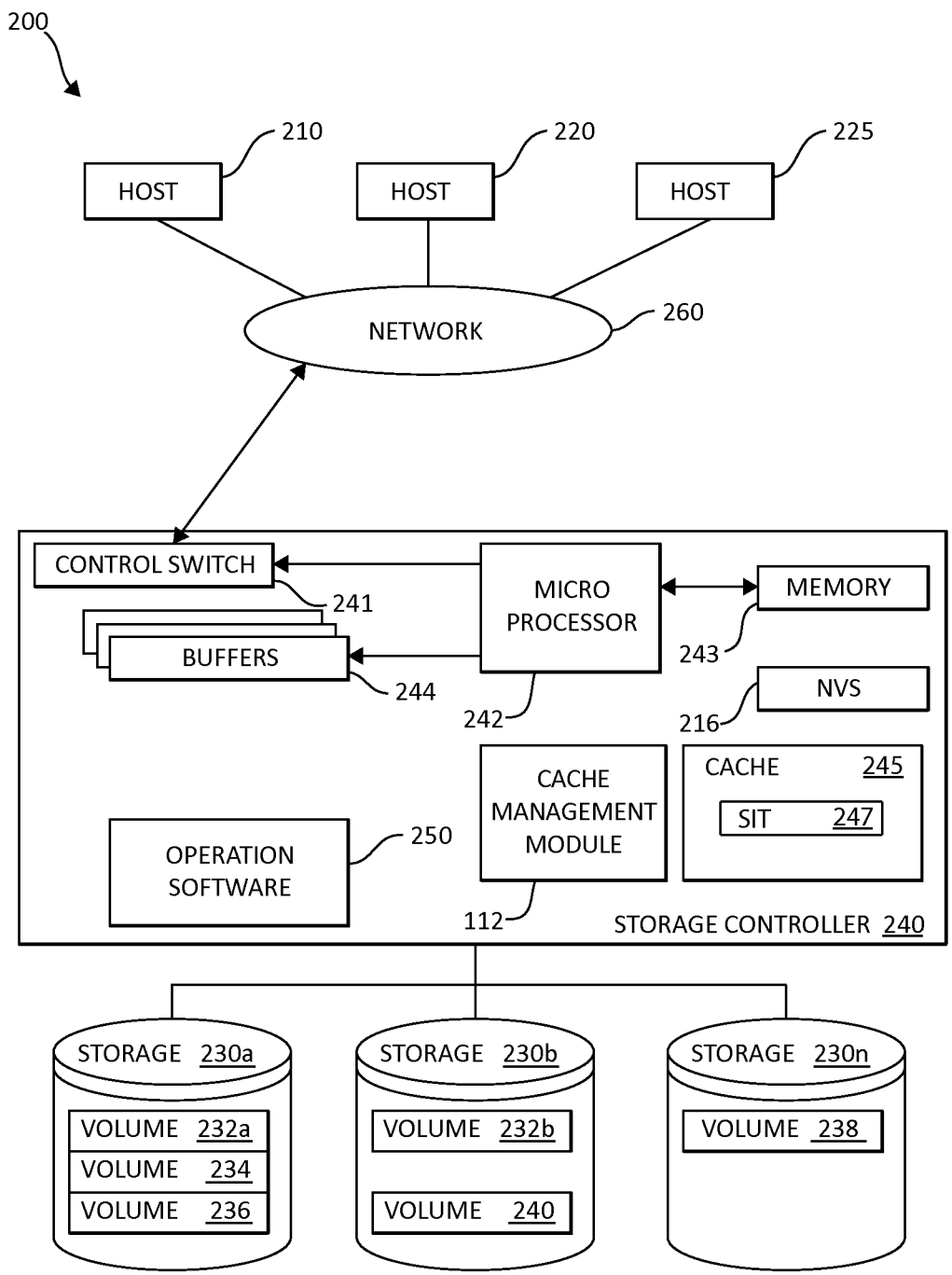
FIG. 2 is an exemplary block diagram showing a hardware structure of a data storage system in a computer system according to the present invention in which aspects of the present invention may be realized.

FIG. 2 is a block diagram 200 illustrating an exemplary hardware structure of a data storage system in which aspects of the present invention may be implemented. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. A Network (e.g., storage fabric) connection 260 may be a fibre channel fabric, a fibre channel point-to-point link, a fibre channel over ethernet fabric or point to point link, a FICON or ESCON I/O interface. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Moreover, given the use of the storage fabric network connection 260, additional architectural configurations may be employed by using the storage fabric 260 to connect multiple storage controllers 240 together with one or more cluster hosts 210, 220, and 225 connected to each storage controller 240.

In some embodiments, the system memory 243 of storage controller 240 includes operation software 250 and stores program instructions and data which the processor 242 may access for executing functions and method steps associated with executing the steps and methods of the present invention. As shown in FIG. 2, system memory 243 may also include or be in communication with a cache 245, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 may be implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

The storage controller 240 may include a cache management module 112. The cache management module 112 may incorporate internal memory (not shown) in which the destaging algorithm may store unprocessed, processed, or "semi-processed" data. The cache management module 112 may work in conjunction with each and every component of the storage controller 240, the hosts 210, 220, 225, and other storage controllers 240 and hosts 210, 220, and 225 that may be remotely connected via the storage fabric 260. Cache management module 112 may be structurally one complete module or may be associated and/or included with other individual modules. Cache management module 112 may also be located in the cache 245 or other components of the storage controller 240.

The storage controller 240 includes a control switch 241 for controlling a protocol to control data transfer to or from the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, and the cache management module 112, in which information may be set. The multiple buffers 244 may be implemented to assist with the methods and steps as described herein.

Cache 245 includes a Scatter Index Table (SIT) 247 as shown. Cache 245, in combination with SIT 247 and cache management module 112 may perform various aspects of the present invention as will be further described, such as disproportionately allocating a smaller portion of the SIT to user data tracks and a larger portion to meta data tracks.

Figure 3:
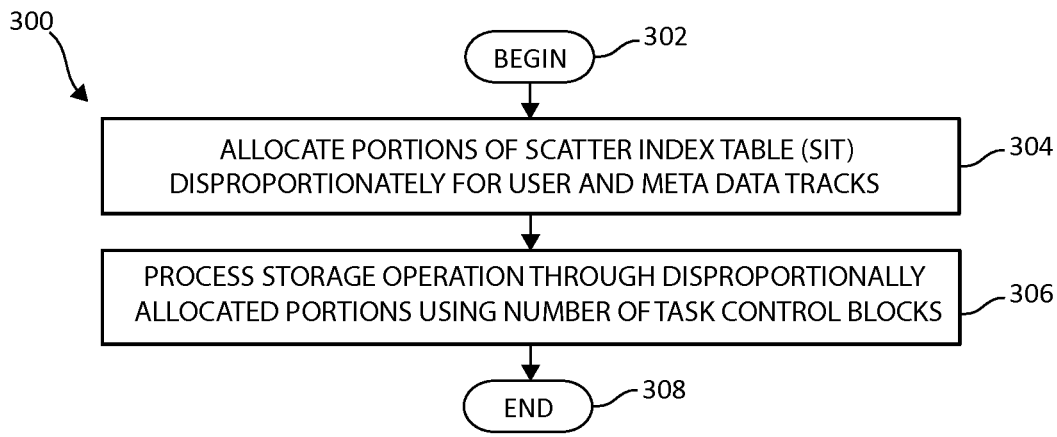
FIG. 3 is a flow chart diagram illustrating an exemplary method for increased efficiency in cache management in a computing storage environment, again in which aspects of the present invention may be realized.

Turning now to FIG. 3, a flow chart diagram, illustrating an generalized method method 300 for cache/data management, is depicted. Method 300 begins (step 302). Portions of a Scatter Index Table (SIT) are allocated disproportionately for User and Meta data tracks (step 304). A storage operation is then subsequently performed through the disproportionately allocated portions using a predefined number of Task Control Blocks (TCBs). The method 300 then ends (step 308).

Figure 4:
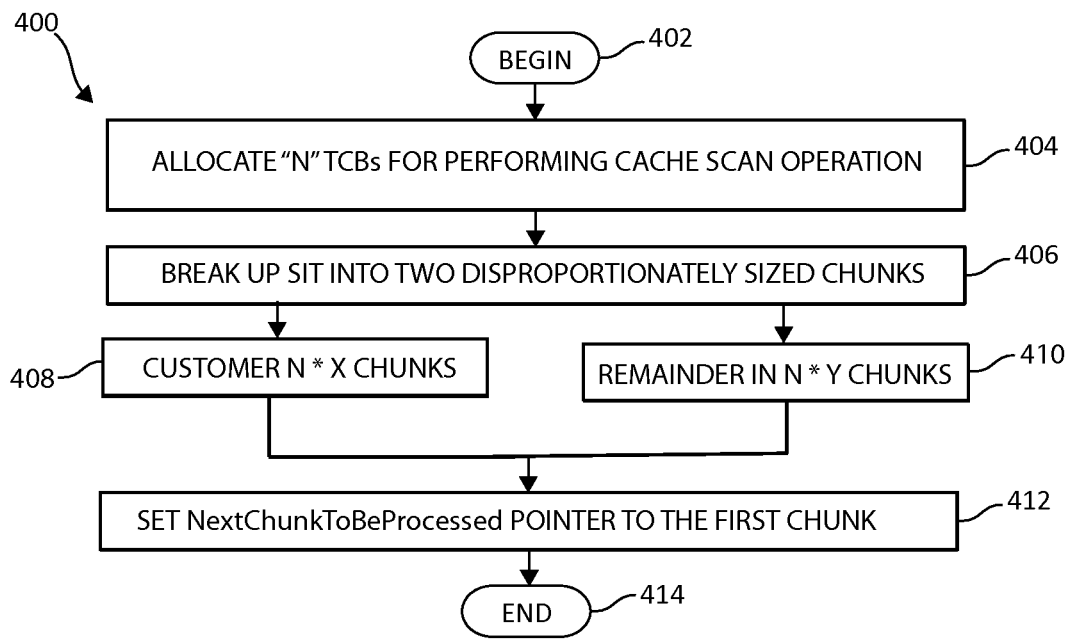
FIG. 4 is an additional flow chart diagram illustrating an exemplary method for performing various operations for cache management enhancement, again in which aspects of the present invention may be implemented.

Turning now to FIG. 4, an additional flow chart diagram of exemplary operations in which aspects of the illustrated embodiments are incorporated, is depicted. Method 400 begins (step 402) with the allocation of a predetermined "N" number of TCBs for performing a cache scan operation (step 404). Since a storage volume has both user (customer) data tracks, which are confined to a small area of the SIT (because the user tracks are hashed sequentially in the SIT), and a much smaller amount of meta data tracks which are spread out over the entire SIT, as a subsequent step, the SIT is broken up into two disproportionately-sized chunks (step 406).

The customer data track area of the SIT is then broken up into N*X chunks (step 408), and the remainder of the SIT into N*Y chunks (step 410), so that the size of the customer/user track area SIT chunks are significantly smaller than the remainder of the SIT chunks. In one embodiment, X and Y are predefined constants. As a subsequent step, a pointer, here exemplified by NextChunkToBeProcessed, is set to the first data chunk (step 412). The method 400 then ends (step 414).

Figure 5:
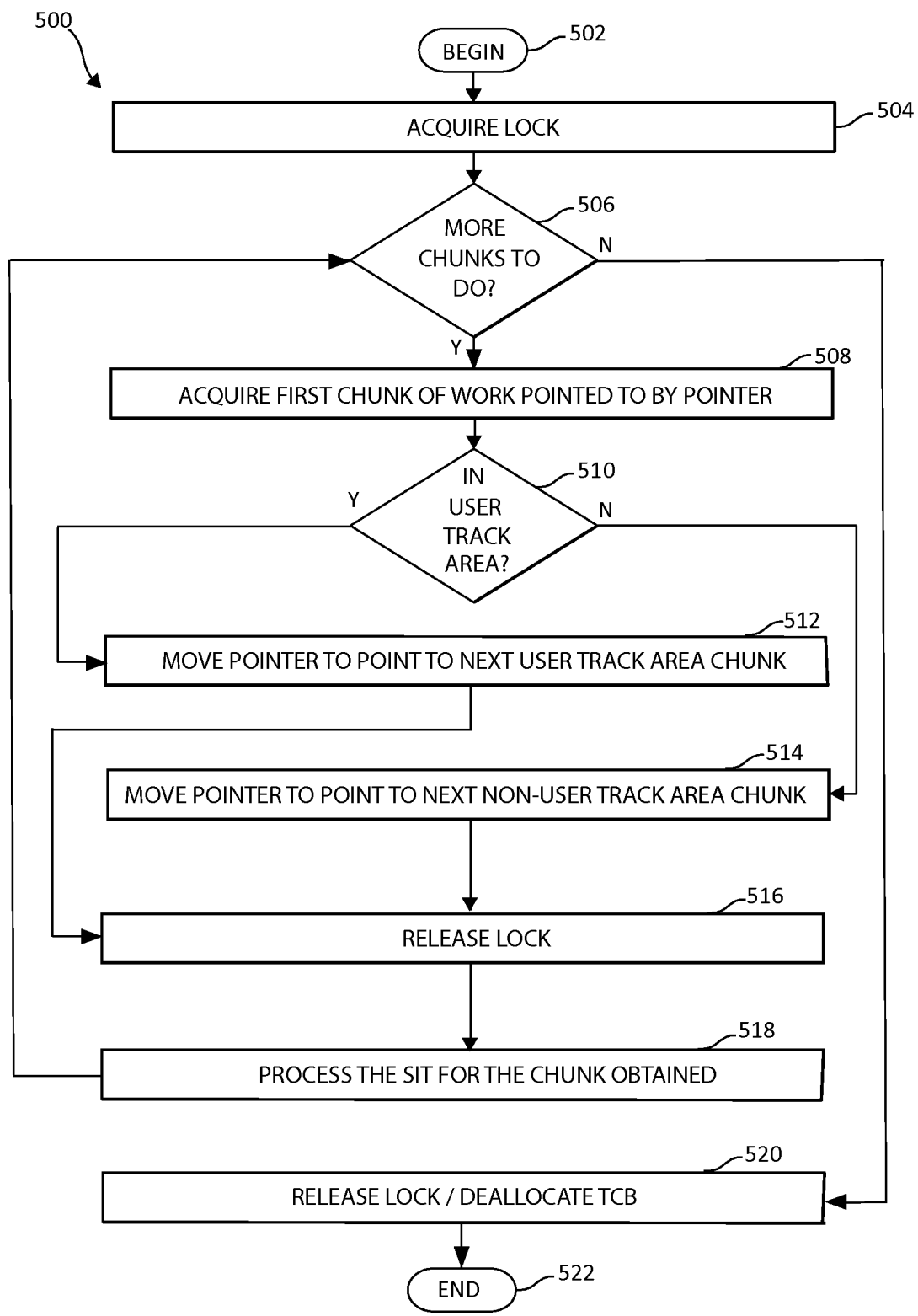
FIG. 5 is an additional flow chart diagram of an exemplary Scan TCB operation, in accordance with the mechanisms of the illustrated embodiments.

FIG. 5, following, is an additional flow chart diagram of an exemplary Scan TCB operation shown as method 500, here again in which aspects of the illustrated embodiments may be implemented. Method 500 begins (step 502), by acquiring a lock (step 504). Method 500 queries if any more chunks remain to be processed (step 506). If no, the method 500 moves to step 520, where the lock is released and the TCB is deallocated. The method 500 then ends (step 522).

Returning to step 506, if additional chunks remain to be processed, the first chunk of work pointed to by the pointer is acquired (step 508). Method 500 then queries if the acquired chunk is in the customer/user track area of the SIT (step 510). If so, the pointer (i.e., NextChunkToBeProcessed) is moved to point to the next customer/user track area chunk (step 512). If the acquired chunk is not in the user track area (again, step 510), the pointer is made to move to point to the next non-user track area chunk (step 514). In either step 512 or 514, once the pointer is moved, the lock is released (step 516), and the SIT is processed for the particular chunk acquired (step 518). The method 500 then returns to step 506 to determine if additional chunks need work.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electro-magnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A method for cache management by a processor device in a computing storage environment, the method comprising:
   allocating portions of a Scatter Index Table (SIT) disproportionately between a larger portion dedicated for meta data tracks, and a smaller portion dedicated for user data tracks; and
   processing a storage operation through the disproportionately allocated portions of the SIT using an allocated number of Task Control Blocks (TCB).

2. The method of claim 1, further including allocating the number of TCBs.

3. The method of claim 1, further including, pursuant to processing the storage operation through the disproportionately allocated portions of the SIT, performing a cache scan operation, wherein the TCBs are scan TCBs.

4. The method of claim 1, further including determining relative sizes of the disproportionately allocated portions of the SIT.

5. The method of claim 1, further including acquiring a data segment to be processed according to the storage operation.

6. The method of claim 5, further including, subsequent to acquiring the data segment to be processed, determining, by one of the TCBs, if the data segment to be processed is a user data segment or a meta data segment.

7. The method of claim 6, further including:
   if the data segment is a user data segment, moving a pointer to point to a next user track area of the user data track portion of the SIT, and processing the SIT for the user data track, and
   if the data segment is a meta data segment, moving the pointer to point to a next meta data track area of the meta data track portion of the SIT, and processing the SIT for the meta data track.

* * * * *